(12) United States Patent
Matsumoto et al.

(10) Patent No.: US 10,244,572 B2
(45) Date of Patent: Mar. 26, 2019

(54) COMMUNICATION CONTROL METHOD AND USER TERMINAL

(71) Applicant: KYOCERA CORPORATION, Kyoto (JP)

(72) Inventors: Naohisa Matsumoto, Kawasaki (JP); Kugo Morita, Yokohama (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 41 days.

(21) Appl. No.: 15/502,061

(22) PCT Filed: Aug. 6, 2015

(86) PCT No.: PCT/JP2015/072417
§ 371 (c)(1),
(2) Date: Feb. 6, 2017

(87) PCT Pub. No.: WO2016/021700
PCT Pub. Date: Feb. 11, 2016

(65) Prior Publication Data
US 2017/0231024 A1    Aug. 10, 2017

Related U.S. Application Data

(60) Provisional application No. 62/035,225, filed on Aug. 8, 2014.

(51) Int. Cl.
*H04W 4/00* (2018.01)
*H04W 76/14* (2018.01)
*H04L 5/00* (2006.01)
*H04W 8/00* (2009.01)
*H04W 48/08* (2009.01)
(Continued)

(52) U.S. Cl.
CPC .......... *H04W 76/14* (2018.02); *H04L 5/0032* (2013.01); *H04L 5/0069* (2013.01); *H04L 5/0091* (2013.01); *H04W 8/005* (2013.01); *H04W 8/24* (2013.01); *H04W 48/08* (2013.01); *H04W 56/002* (2013.01); *H04W 72/0406* (2013.01);
(Continued)

(58) Field of Classification Search
CPC ..... H04W 76/14; H04W 8/24; H04W 56/002; H04W 76/023; H04W 72/0406; H04W 48/08; H04W 88/04
See application file for complete search history.

(56) References Cited

U.S. PATENT DOCUMENTS

2017/0135048 A1* 5/2017 Cao .................. H04W 52/245
2017/0142741 A1* 5/2017 Kaur ................. H04W 76/18
(Continued)

OTHER PUBLICATIONS

International Search Report issued in PCT/JP2015/072417; dated Oct. 27, 2015.
(Continued)

*Primary Examiner* — Clemence S Han
(74) *Attorney, Agent, or Firm* — Studebaker & Brackett PC

(57) ABSTRACT

A communication control method according to the present invention is used in a mobile communication system that supports D2D communication that is direct Device-to-Device communication. The communication control method comprises a step of transmitting, by a first user terminal in a cell coverage, to another user terminal, identification information for identifying that the first user terminal is located in a cell.

2 Claims, 7 Drawing Sheets

(51) Int. Cl.
*H04W 8/24* (2009.01)
*H04W 56/00* (2009.01)
*H04W 72/04* (2009.01)
*H04W 88/04* (2009.01)

(52) U.S. Cl.
CPC .......... *H04L 5/0023* (2013.01); *H04L 5/0044* (2013.01); *H04W 88/04* (2013.01)

(56) References Cited

U.S. PATENT DOCUMENTS

| | | | |
|---|---|---|---|
| 2017/0195163 A1* | 7/2017 | Chae | H04W 4/70 |
| 2017/0215154 A1* | 7/2017 | Kim | H04W 52/245 |
| 2017/0230956 A1* | 8/2017 | Kim | H04W 72/0406 |
| 2018/0077659 A9* | 3/2018 | Li | H04W 76/14 |

OTHER PUBLICATIONS

Written Opinion issued in PCT/JP2015/072417; dated Oct. 27, 2015.
An Office Action; "Final Reason for Rejection," issued by the Japanese Patent Office on Dec. 27, 2016, which corresponds to Japanese Patent Application No. 2016-540745; and is related to the present application; with English language Concise Explanation.
Qualcomm Incorporated; Signal Design for D2D Synchronization; 3GPP TSG-RAN WG1 #77; R1-141974; May 19-May 23, 2014; pp. 1-10; Seoul, Korea.
Catt; Discussion on D2D synchronization procedure; 3GPP TSG-RAN WG1 Meeting #76bis; R1-141198; Mar. 31-Apr. 4, 2014; pp. 1-7; Shenzhen, China.
3rd Generation Partnership Project; Technical Specification Group Radio Access Network; Study on LTE Device to Device Proximity Services; Radio Aspects (Release 12); 3GPP TR 36.843 v.12.0.1; Mar. 2014; pp. 1-50; Valbonne, France.
Extended European Search Report issued in 15829820.8; dated Dec. 19, 2017.
Intel Corporation; "Resource allocation signaling for D2D communication"; 3GPP TSG RAN WG2 Meeting #86; R2-142045; Seoul, Korea; May 19-23, 2014; 4pp.
"Partial coverage communication"; 3GPP TSG RAN WG2 Meeting #86; R2-142639; Seoul, Korea; May 19-23, 2014; 3pp.
An Office Action; "Final Reason for Rejection," issued by the Japanese Patent Office dated Mar. 21, 2017, which corresponds to Japanese Patent Application No. 2016-540745; and is related to the present application; with English language Concise Explanation.
Catt; "Design of D2DSS and PD2DSCH"; 3GPP TSG RAN WG1 Meeting #77; R1-142007; Seoul, Korea; May 19-23, 2014; 5pp.
ZTE; "SA and Data Resource Allocation for Mode 1"; 3GPP TSG RAN WG1 Meeting #77; R1-142232; Seoul, Korea; May 19-23, 2014; 5pp.
Kyocera; "Synchronization resource allocation"; 3GPP TSG RAN WG1 Meeting #77; R1-142487; Seoul, Korea; May 19-23, 2014; 3pp.

* cited by examiner

FIG. 7

```
                              symbol
D2DSS config   0  1  2  3  4  5  6  7  8  9 10 11 12 13
                  P  S                                    0  RB
                  D  D                                    1
                  2  2      PD2D                          2
        0         D  D      SCH                           3
                  S  S                                    4
                  S  S                                    5

P  S
                                    D  D
                                    2  2    PD2D
        1                           D  D    SCH
                                    S  S
                                    S  S
```

_COMMUNICATION CONTROL METHOD AND USER TERMINAL_

TECHNICAL FIELD

The present invention relates to a communication control method and a user terminal used in a mobile communication system that supports D2D communication that is direct Device-to-Device communication.

BACKGROUND ART

In 3GPP (3rd Generation Partnership Project) which is a project aiming to standardize a mobile communication system, the introduction of a Device to Device (D2D) proximity service is discussed as a new function in Release 12 and later (see Non Patent Document 1).

The D2D proximity service (D2D ProSe) is a service enabling direct Device-to-Device communication within a synchronization cluster including a plurality of synchronized user terminals. The D2D proximity service includes a D2D discovery procedure (Discovery) in which a proximal terminal is discovered and D2D communication (Communication) that is direct Device-to-Device communication.

PRIOR ART DOCUMENTS

Non Patent Document

[Non Patent Document 1] 3GPP technical report "TR 36.843 V12.0.1" Mar. 27, 2014

SUMMARY

A communication control method according to an embodiment is used in a mobile communication system that supports D2D communication that is direct Device-to-Device communication. The communication control method comprises a step of transmitting, by a first user terminal in a cell coverage, to another user terminal, identification information for identifying that the first user terminal is located in a cell.

BRIEF DESCRIPTION OF DRAWINGS

FIG. 7 is a diagram for describing an arrangement of a radio resource used for transmitting a D2D synchronization signal according to first and second embodiments.

DESCRIPTION OF THE EMBODIMENT

Overview of Embodiment

Figure 1:
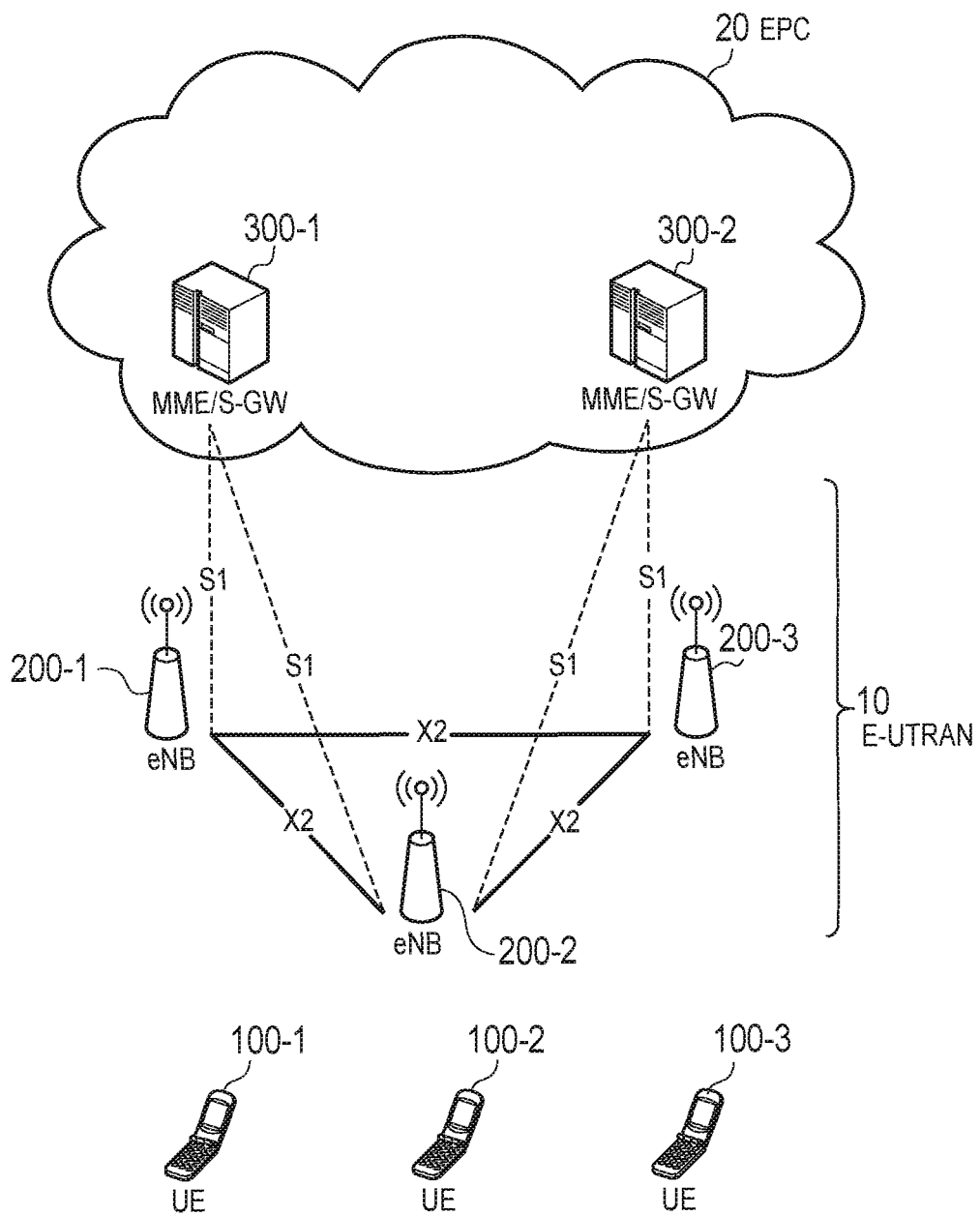
FIG. 1 is a configuration diagram of an LTE system.

A communication control method according to an embodiment supports D2D communication that is direct Device-to-Device communication. The communication control method comprises a step of transmitting, by a first user terminal in a cell coverage, to another user terminal, identification information for identifying that the first user terminal is located in a cell.

The communication control may further comprise a step of receiving, by a second user terminal out of a cell coverage, the identification information and transmitting D2D data, when an in-cell resource pool used for the D2D communication in a cell coverage of a cell identified by the identification information is stored.

In the step of transmitting the D2D data, the D2D data may be transmitted by using a specific out-of-cell resource pool included in the in-cell resource pool.

The identification information may be an identifier included in a synchronization signal transmitted in a D2D synchronization procedure in which a device-to-device synchronization is established The synchronization signal may include power control information for controlling transmission power of the D2D communication of a user terminal out of a cell coverage.

A communication control method according to an embodiment is used in a mobile communication system that supports D2D communication that is direct Device-to-Device communication. The communication control method comprises the steps of transmitting, by a first user terminal in a cell coverage, an index for designating an in-cell resource pool used for the D2D communication in the cell coverage; and receiving, by a second user terminal out of a cell coverage, the index, and when an in-cell resource pool corresponding to the received index is stored, transmitting D2D data by using an in-cell resource pool designated by the index.

In the step of transmitting the D2D data, when the in-cell resource pool designated by the index is not stored, the second user terminal may use a specific out-of-cell resource pool included in the in-cell resource pool to transmit the D2D data.

The communication control method may further comprise a step of storing, by the second user terminal, a cell to be mapped with an in-cell resource pool. In the step of transmitting the index, the first user terminal transmits, together with the index, identification information for identifying a cell in which the first user terminal exists, and in the step of transmitting the D2D data, when the in-cell resource pool mapped with the cell indicated by the identification information from the first user terminal is stored, the second user terminal may use the in-cell resource pool designated by the index to transmit the D2D data.

The communication control method may further comprise a step of receiving, by the second user terminal, an in-cell resource pool from the cell when located in a cell coverage of the cell in which the first user terminal exists. In the step of storing, the second user terminal may store the cell to be mapped with the received in-cell resource pool.

The in-cell resource pool includes a plurality of resource pools different in arrangement in a time-frequency direction, and each of the plurality of resource pools may include the specific out-of-cell resource pool.

A user terminal according to an embodiment supports D2D communication that is direct Device-to-Device communication. The use terminal comprises a controller configured to transmitting, when in a cell coverage, to another user terminal, identification information for identifying that the user terminal is located in a cell.

First Embodiment

A first embodiment in which the present invention is applied to an LTE system will be described, below.

(System Configuration)

FIG. 1 is a configuration diagram of an LTE system according to an embodiment. As shown in FIG. 1, the LTE system according to the embodiment includes UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a connected cell (a serving cell). Configuration of the UE 100 will be described later.

The E-UTRAN 10 corresponds to a radio access network. The E-UTRAN 10 includes eNBs 200 (evolved Node-Bs). The eNB 200 corresponds to a base station. The eNBs 200 are connected mutually via an X2 interface. Configuration of the eNB 200 will be described later.

The eNB 200 manages a cell or a plurality of cells and performs radio communication with the UE 100 that establishes a connection with the cell of the eNB 200. The eNB 200, for example, has a radio resource management (RRM) function, a function of routing user data, and a measurement control function for mobility control and scheduling. It is noted that the "cell" is used as a term indicating a minimum unit of a radio communication area, and is also used as a term indicating a function of performing radio communication with the UE 100.

The EPC 20 corresponds to a core network. A network of the LTE system (a LTE network) is configured by the E-UTRAN 10 and the EPC 20. The EPC 20 includes MME (Mobility Management Entity)/S-GW (Serving-Gateway) 300. The MME performs various mobility controls and the like, for the UE 100. The S-GW performs control to transfer user data. The MME/S-GW 300 is connected to the eNB 200 via an S1 interface.

Figure 2:
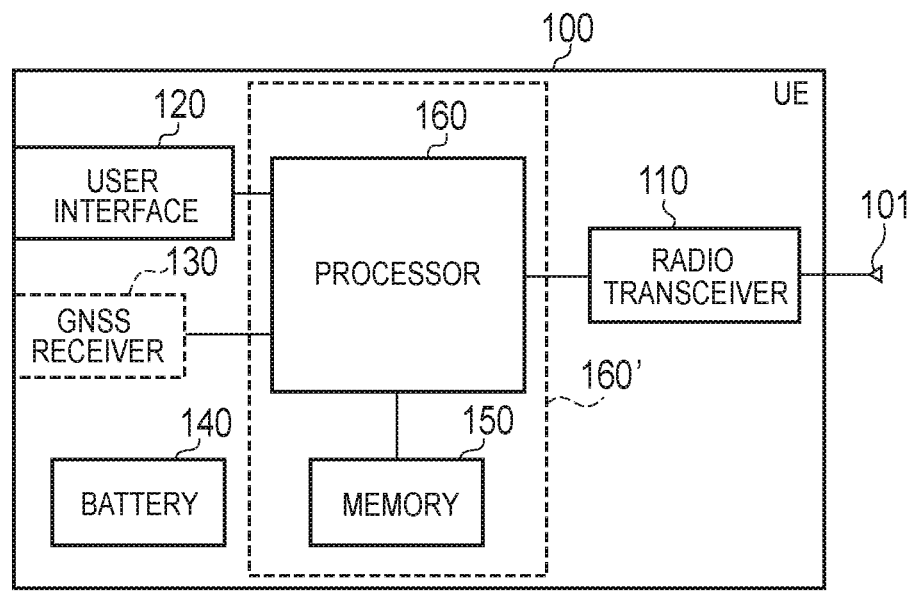
FIG. 2 is a block diagram of a UE.

FIG. 2 is a block diagram of the UE 100. As shown in FIG. 2, the UE 100 includes an antenna 101, a radio transceiver 110, a user interface 120, GNSS (Global Navigation Satellite System) receiver 130, a battery 140, a memory 150, and a processor 160. The memory 150 corresponds to a storage unit, and the processor 160 corresponds to a control unit. The UE 100 may not have the GNSS receiver 130. Furthermore, the memory 150 may be integrally formed with the processor 160, and this set may be a processor 160' constituting the control unit.

The antenna 101 and the radio transceiver 110 are used to transmit and receive a radio signal. The radio transceiver 110 converts a baseband signal (a transmission signal) output from the processor 160 into the radio signal, and transmits the radio signal from the antenna 101. Furthermore, the radio transceiver 110 converts a radio signal (a reception signal) received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
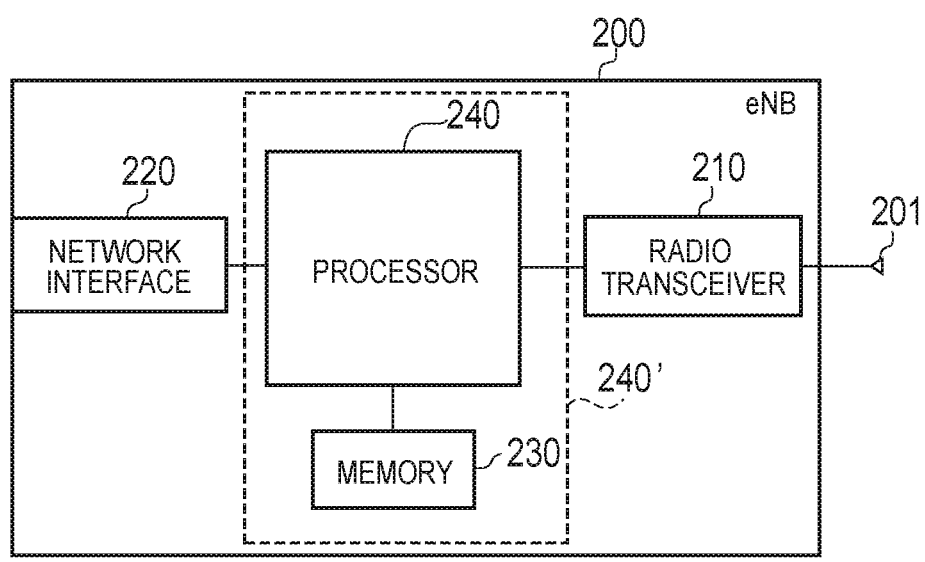
FIG. 3 is a block diagram of an eNB.

FIG. 3 is a block diagram of the eNB 200. As shown in FIG. 3, the eNB 200 includes an antenna 201, a radio transceiver 210, a network interface 220, a memory 230, and a processor 240. It is note that the memory 230 may be integrated with the processor 240, and this set (that is, a chipset) may be a processor 240' constituting the control unit.

The antenna 201 and the radio transceiver 210 are used to transmit and receive a radio signal. The radio transceiver 210 converts a baseband signal (a transmission signal) output from the processor 240 into the radio signal, and transmits the radio signal from the antenna 201. Furthermore, the radio transceiver 210 converts a radio signal (a reception signal) received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
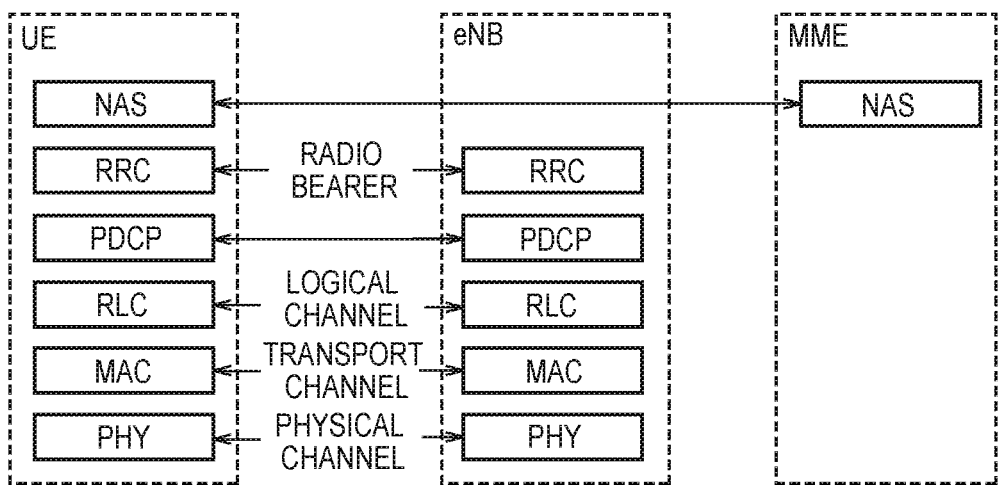
FIG. 4 is a protocol stack diagram.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes MAC (Medium Access Control) layer, RLC (Radio Link Control) layer, and PDCP (Packet Data Convergence Protocol) layer. The layer 3 includes RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted through the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a transport format of an uplink and a downlink (a transport block size, a modulation and coding scheme) and a scheduler to decide (schedule) an allocated resource block to the UE 100.

The RLC layer transmits data to an RLC layer of a reception side by using the functions of the MAC layer and the PHY layer. Between the RLC layer of the UE 100 and the RLC layer of the eNB 200, user data and a control signal are transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When a connection (an RRC connection) is established between the RRC of the UE 100 and the RRC of the eNB 200, the UE 100 is in an RRC connected state, and when the connection is not established, the UE 100 is in an RRC idle state.

NAS (Non-Access Stratum) layer positioned above the RRC layer performs session management, mobility management and the like.

Figure 5:
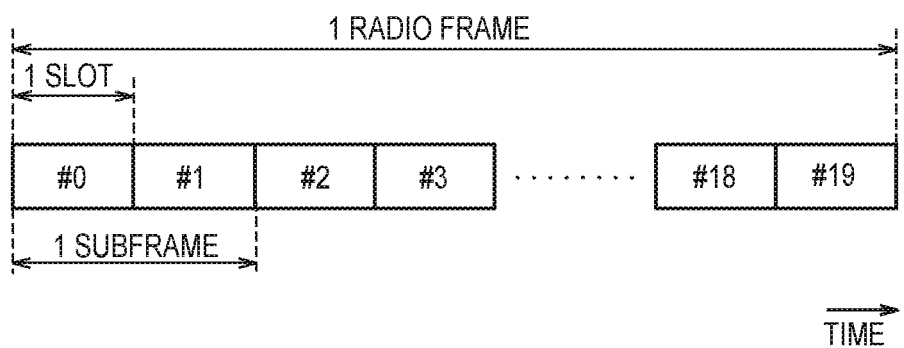
FIG. 5 is a configuration diagram of a radio frame.

FIG. 5 is a configuration diagram of a radio frame used in the LTE system. In the LTE system, OFDMA (Orthogonal Frequency Division Multiple Access) is employed in a downlink (DL), and SC-FDMA (Single Carrier Frequency Division Multiple Access) is employed in an uplink (UL), respectively.

As shown in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. A resource element is configured by one subcarrier and one symbol. Among radio resources allocated to the UE 100, a frequency resource is configured by a resource block and a time resource is configured by a subframe (or slot).

(D2D Proximity Service)

A D2D proximity service will be described, below. An LTE system according to an embodiment supports the D2D proximity service. The D2D proximity service is described in Non Patent Document 1, and an outline thereof will be described here.

The D2D proximity service (D2D ProSe) is a service enabling direct UE-to-UE communication within a synchronization cluster including a plurality of synchronized UEs 100. The D2D proximity service includes a D2D discovery procedure (Discovery) in which a proximal UE is discovered and D2D communication (Communication) that is direct UE-to-UE communication. The D2D communication is also called Direct Communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

In "In coverage", the eNB 200 is a D2D synchronization source, for example. A D2D asynchronization source, from which a D2D synchronization signal is not transmitted, is synchronized with the D2D synchronization source. The eNB 200 that is a D2D synchronization source transmits, by a broadcast signal, D2D resource information indicating a radio resource available for the D2D proximity service. The D2D resource information includes information indicating a radio resource available for the D2D discovery procedure (Discovery resource information) and information indicating a radio resource available for the D2D communication (Communication resource information), for example. The UE 100 that is a D2D asynchronization source performs the D2D discovery procedure and the D2D communication on the basis of the D2D resource information received from the eNB 200. The Communication resource information may include not only information indicating a radio resource available for exchanging data (data resource information), but also information indicating a radio resource available for exchanging a Scheduling Assignment (SA) (SA resource information). The SA is information indicating a location of a time-frequency resource used for receiving data in D2D communication.

In "Out of coverage" or "Partial coverage", the UE 100 is a D2D synchronization source, for example. In "Out of coverage", the UE 100 that is a D2D synchronization source transmits D2D resource information indicating a radio resource available for the D2D proximity service, by a D2D synchronization signal, for example. The D2D synchronization signal is a signal transmitted in the D2D synchronization procedure in which a device-to-device synchronization is established. The D2D synchronization signal includes a D2DSS and a physical D2D synchronization channel (PD2DSCH). The D2DSS is a signal for providing a synchronization standard of a time and a frequency. The PD2DSCH is a physical channel through which more information can be conveyed than the D2DSS.

The D2D synchronization signal includes a first D2D synchronization signal (D2DSSue_net), transmitted by the UE 100, in which a transmission timing reference of the D2D synchronization signal is the eNB 200, and a second D2D synchronization signal (D2DSSue_oon), transmitted by the UE 100, in which a transmission timing reference of the D2D synchronization signal is not the eNB 200.

In the D2D discovery procedure, a discovery signal for discovering a proximal terminal (hereinafter, "Discovery signal") is transmitted. Types of the D2D discovery procedure include: a first discovery type (Type 1 discovery) in which a radio resource not uniquely assigned to the UE 100 is used for transmitting the Discovery signal; and a second discovery type (Type 2 discovery) in which a radio resource uniquely assigned to each UE 100 is used for transmitting the Discovery signal. In the second discovery type, a radio resource individually assigned to each transmission of the Discovery signal or a radio resource semi-persistently assigned is used.

Further, modes of the D2D communication include: a first mode (Mode 1) in which the eNB 200 or a relay node assigns a radio resource for transmitting D2D data (D2D data and/or control data); and a second mode (Mode 2) in which the UE 100 itself selects the radio resource for transmitting the D2D data from the resource pool. The UE 100 performs the D2D communication in either mode. For example, the UE 100 in the RRC connected state performs the D2D communication in the first mode, and the out-of-coverage UE 100 performs the D2D communication in the second mode.

(Communication Resource Pool)

Figure 6:
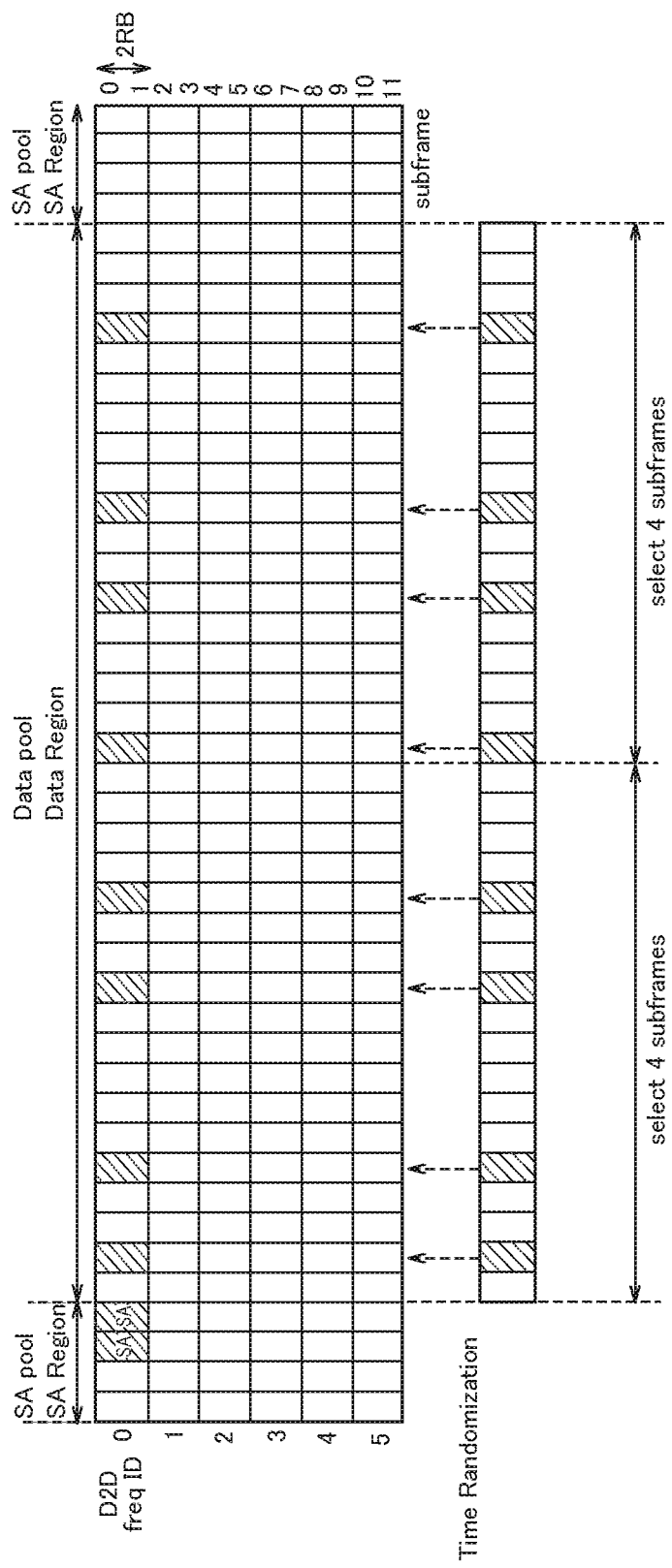
FIG. 6 is a diagram for describing a Communication resource pool according to a first embodiment.

Next, the Communication resource pool will be described by using FIG. 6. FIG. 6 is a diagram for describing the Communication resource pool according to the first embodiment.

The Communication resource pool includes an SA resource pool that is a pool of radio resources available for exchanging SA, and a data resource pool that is a pool of radio resources available for exchanging D2D communication data.

The UE 100 selects a radio resource used for transmitting data, from the time-frequency resource in a data resource pool (data region) arranged periodically in a time direction. For example, when a timing at which identical data is transmitted in the time direction is randomly set, the UE 100 randomly selects four subframes from a first-half time-frequency resource in the data region and randomly selects four subframes from a latter-half time-frequency resource in the data region, as shown in FIG. 6. The UE 100 uses the selected eight subframes to transmit the data. Alternatively, the UE 100 may use the four subframes selected from the first-half time-frequency resource in the data region to repeatedly transmit the data, and may use the four subframes selected from the first-half time-frequency resource in the data region to repeatedly transmit another data.

The UE 100 selects the time-frequency resource for transmitting SA (Schedule Assignment) indicating a location of (time-frequency resource for) data transmitted by the D2D communication, from the time-frequency resource in an SA resource pool (SA Region) arranged periodically in the time direction.

In FIG. 6, the frequency location of the SA is the same as the frequency location of the time-frequency resource for data, and thus, the UE that receives the SA is capable of recognizing, by the frequency location of the SA, the frequency location of the data. Out of the two SAs, the first-half SA may indicate the location of the first-half data in the data region, and the latter-half SA may indicate the location of the latter-half data in the data region.

It is noted that in FIG. 6, the frequency location of the SA is the same as the frequency location of the time-frequency resource for data; however, the frequency location of the time-frequency resource for data may be random. In this case, information indicating the frequency location of the time-frequency resource for data may be included in the SA. Alternatively, the frequency location of the time-frequency resource for data may be associated with the frequency location of the SA so that the frequency location of the time-frequency resource for data is random depending on the frequency location of the SA.

In the present embodiment, the in-cell resource pool includes a (specific) out-of-cell resource pool. For example, when the in-cell resource pool is a time-frequency resource having a D2D frequency ID of 0 to 6, the out-of-cell resource pool is a time-frequency resource having a D2D frequency ID of 5 to 6 which is a part of the in-cell resource pool.

(D2D Synchronization Signal)

Next, a D2D synchronization signal will be described by using FIG. 7. FIG. 7 is a diagram for describing an arrangement of a radio resource used for transmitting the D2D synchronization signal according to the present embodiment.

As shown in FIG. 7, to the D2D synchronization resource pool, a D2D synchronization resource for transmitting a D2D synchronization signal is assigned. The UE 100, which is a D2D synchronization source, performs setting for transmitting the D2D synchronization signal. As the setting for transmitting a D2D synchronization signal, there are at least two types of settings (two candidates) different in location (specifically, no overlapping) of the D2D synchronization resource in the time direction. In the first discover scheme, the UE 100, which is a D2D synchronization source, selects either one of the settings. To restrain interference between the D2D synchronization signals, the UE 100 may randomly select either one of the settings, and may select a setting that is not set by another D2D-synchronization-source UE on the basis of the D2D synchronization signal received from the other D2D-synchronization-source UE. Depending on each setting, the time location of the D2D synchronization resource used differs. In the first discovery scheme, in the UE 100, (prior) setting for transmitting the D2D synchronization signal is performed by SIB or a dedicated RRC signaling. On the other hand, in the second discovery scheme, the UE 100 from which D2D synchronization is originated selects either one of the settings by an instruction from the eNB 200.

It is noted that the D2D synchronization resource pool is arranged in a head subframe of the SA resource pool in the time direction.

On the other hand, a UE 100, which is a D2D asynchronization source and is located out of the cell coverage, receives a D2D synchronization signal (D2DSS config. 0) located forward in the time direction, and when a reception level of the received D2D synchronization signal is less than a threshold value, the UE 100 may synchronize on the basis of a D2D synchronization signal located backward in the time direction.

As described above, a D2D synchronization signal includes a D2DSS and a PD2DSCH. The D2DSS is a signal for providing a synchronization standard of a time and a frequency. In addition, the D2DSS is used for demodulating the PD2DSCH. The width in the time direction of the D2DSS is two symbols, for example.

The D2DSS includes PD2DSS and SD2DSS. The PD2DSS is a primary synchronization signal in the D2D communication. The SD2DSS is a secondary synchronization signal in the D2D communication. The width in the time direction of the PD2DSS and the SD2DSS is one or two symbols, for example. In the time direction, the PD2DSS and the SD2DSS are arranged in this order.

The PD2DSCH is arranged next to the D2DSS in the time direction. The width in the time direction of the PD2DSHC is four symbols, for example. Further, in the present embodiment, the PD2DSCH may include information shown below.

TABLE 1

| Item | Num of bits |
| --- | --- |
| Whether this D2DSS is originally derived from eNB | 1 bit |
| D2D SFN(10 bits) and slot number(5 bits) | 15 bits |
| Max Tx power | 1 bit (Max power/predefined reduced power) [In-coverage UE only] |
| Hop count | 0 bits |
| Total | 17 bits |

The PD2DSS may include information indicating whether or not the D2D synchronization signal originates from the eNB 200. The information can be indicated by 1 bit.

Further, the PD2DSCH may include information (parameter) indicating a location of the D2DSS and the PD2DSCH. Specifically, the PD2DSCH may include information indicating D2D SFN and a slot number. The information can be indicated by 15 bits.

Further, the PD2DSCH may include information for controlling transmission power of the D2D communication. The information may be information indicating the use of a maximum transmission power and may be information indicating the use of a previously set value. The information may be effect only when the in-cell-coverage UE transmits a D2D synchronization signal originating from the eNB 200 (first D2D synchronization signal). The information can be indicated by 1 bit.

It is noted that the information may be applied not only to the transmission power of the D2D communication but also to the transmission power of the Discovery signal.

Further, the PD2DSCH may include information indicating the number of hops when information included in a D2D synchronization signal is transferred from another UE 100. In the present embodiment, the information is not included.

It is noted that the PD2DSCH may include information indicating a bandwidth. The information may be indicated by 3 bits.

It is noted that in the present embodiment, as shown in Table 1, the PD2DSCH does not carry the D2D resource information. Therefore, the D2D synchronization signal does not include the information on the Communication resource pool.

(Operation According to First Embodiment)

Figure 8:
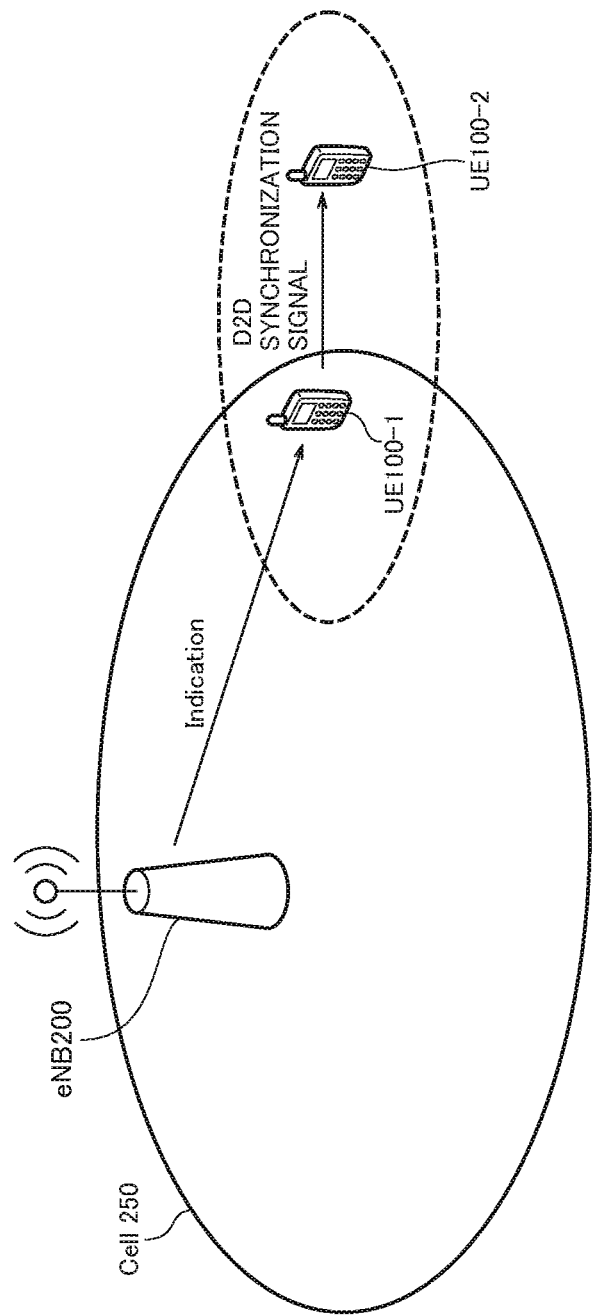
FIG. 8 is a diagram for describing an arrangement of a radio resource used for transmitting a D2D synchronization signal according to the first and second embodiments.

Next, an operation according to the embodiment will be described by using FIG. 8. FIG. 8 is an explanatory diagram for describing an operation according to the embodiment.

As shown in FIG. 8, a UE 100-1 is located in a cell coverage of a cell 250, and is in an RRC connected state at the cell 250. Alternatively, a UE 100-2 may be in an RRC idle state. The UE 100-2 is located out of the cell coverage of the cell 250 managed by the eNB 200 and is in an RRC idle state at the cell 250.

In the present embodiment, the eNB 200 sets a Communication resource pool (hereinafter, "in-cell resource pool") available in the cell coverage of the cell 250. The eNB 200 (cell 250) transmits to at least the UE near the cell end and in the cell coverage of the cell 250, setting information including the information on the in-cell resource pool. The UE that receives the setting information stores the in-cell resource pool. Further, the UE stores a cell identifier indicating the cell 250 from which the in-cell resource pool is transmitted in a manner to be mapped with the in-cell resource pool.

Further, the UE receives from the eNB 200 information (D2D frequency ID) designating the transmission resource pool from the in-cell resource pool. The UE is capable of performing the D2D communication by using the time-frequency resource in the designated in-cell resource pool. It is noted that the in-cell resource pool includes an SA resource pool and a data resource pool.

Further, the eNB 200 sets a Communication resource pool (hereinafter, "out-of-cell resource pool") available out of the cell coverage of the cell 250. The eNB 200 (cell 250) transmits, to the UE in the cell coverage of the cell 250, setting information including the information on the out-of-cell resource pool. The UE that receives the setting information stores the out-of-cell resource pool. It is noted that the out-of-cell resource pool is a previously set resource pool used in the D2D communication in a second mode.

When performing the D2D communication in the second mode, when moving out of the cell coverage, for example, the UE that receives the setting information selects the out-of-cell resource pool. The UE is capable of performing the D2D communication by using the selected out-of-cell resource pool as the transmission resource pool. Alternatively, out of the in-cell resource pool, the data resource pool designated from another UE is used, as the reception resource pool, to perform the D2D communication. It is noted that in much the same way as in the in-cell resource pool, the out-of-cell resource pool includes an SA resource pool and a data resource pool.

Here, the out-of-cell resource pool includes a specific Communication resource pool (hereinafter, "specific resource pool"). The specific resource pool is a resource pool not including the time-frequency resource for cellular communication. That is, the specific resource pool is a resource pool dedicated to the D2D communication. Alternatively, the specific resource pool may be a resource pool not used for the time-frequency resource for cellular communication until a use amount or a use rate of the time-frequency resource for cellular communication does not exceed a threshold value. Thus, in the time-frequency resource in the specific resource pool, assignment for the cellular communication is restricted. It is noted that the specific resource pool may be equal to the out-of-cell resource pool.

In such an operation environment, the following operation is performed.

Firstly, the eNB 200 sets the UE 100-1 located near the cell end of the cell 250 and in the cell coverage, as the D2D synchronization source. The eNB 200 transmits, to the UE 100-1, setting information for setting the UE 100-1 as a D2D synchronization source.

Further, the UE 100-1 sets the specific resource pool as the reception resource pool. When the in-cell resource pool includes the specific resource pool, the UE 100-1 sets the in-cell resource pool as the reception resource pool. The UE 100-1 is capable of setting the reception resource pool on the basis of the setting information from the eNB 200.

Secondly, the UE 100-1 that receives the setting information performs the setting for becoming a D2D synchronization source, and starts transmitting the D2D synchronization source.

The D2D synchronization signal includes identification information for identifying that the UE that transmits the D2D synchronization signal is located inside the cell. The identification information may be a cell identifier (cell ID) and may be an identifier of the D2D synchronization signal. The identifier of the D2D synchronization signal is an identifier generated on the basis of the cell identifier, and it is possible to derive the cell identifier from the identifier of the D2D synchronization signal.

Further, the D2D synchronization signal may include information for controlling transmission power of the out-of-cell-coverage UE.

Thirdly, the UE 100-2 that receives the D2D synchronization signal determines whether or not the in-cell resource pool corresponding to the cell indicated by the cell identifier is stored. When the corresponding in-cell resource pool is stored, the UE 100-2 starts controlling to start the D2D communication by using the corresponding in-cell resource pool. Specifically, the UE 100-2 sets the in-cell resource pool as the transmission resource pool and the reception resource pool. Therefore, the UE 100-2 sets the in-cell resource pool, rather than the previously set out-of-cell resource pool, as the transmission resource pool and the reception resource pool.

On the other hand, when the in-cell resource pool corresponding to the cell indicated by the cell identifier is not stored, the UE 100-2 sets the specific resource pool as the transmission resource pool and the reception resource pool. When the specific resource pool is equal to the out-of-cell resource pool (that is, the specific resource pool is not a part of the out-of-cell resource pool), the UE 100-2 sets the out-of-cell resource pool as the transmission resource pool and the reception resource pool. The UE 100-1 sets the specific resource pool as the reception resource pool, and thus, even when the UE 100-2 does not know the in-cell resource pool, the D2D communication is capable of restraining interference from being applied to the user terminal that performs the cellular communication. Further, the D2D synchronization signal does not include the information on the in-cell resource pool and the UE 100-1 does not notify the in-cell resource pool, and thus, it is possible to reduce an amount of information of the signaling.

It is noted that when the UE 100-2 existed in the cell 250 in the past (when the UE 100-2 was located in the cell coverage of the cell 250), the UE 100-2 receives the in-cell resource pool from the eNB 200 (cell 250), and stores the received in-cell resource pool to be mapped with the transmission-source cell 250. Alternatively, the UE 100-2 may receive, from the eNB 200 (cell 250), a mapping list in which a plurality of in-cell resource pools are mapped with a plurality of cells, and then, may store the mapping list.

Thereafter, the UE 100-2 uses the set transmission resource pool to transmit the SA and the data. On the other hand, the UE 100-1 uses the reception resource pool to receive the SA and the data.

When receiving the information for controlling the transmission power of the out-of-cell coverage UE, the UE 100-2 performs the D2D communication in accordance with the information. This allows the UE 100-2 to restrain the interference applied to the cellular UE.

As described above, when the in-cell resource pool corresponding to the cell indicated by the cell identifier is stored, the UE 100-2 transmits the data by using the corresponding resource pool. When the in-cell resource pool corresponding to the cell indicated by the cell identifier is not stored, the UE 100-2 transmits the data by using a specific resource pool. This makes it possible to omit the notification of the in-cell resource pool, and as a result, it is possible to reduce an amount of information from the UE 100-1 to the UE 100-2. Further, the UE 100-2 is capable of restraining the interference applied to the cellular UE.

Second Embodiment

Next, a second embodiment will be described. It is noted that description of parts similar to the first embodiment will be omitted where appropriate.

(Communication Resource Pool)

Figure 9:
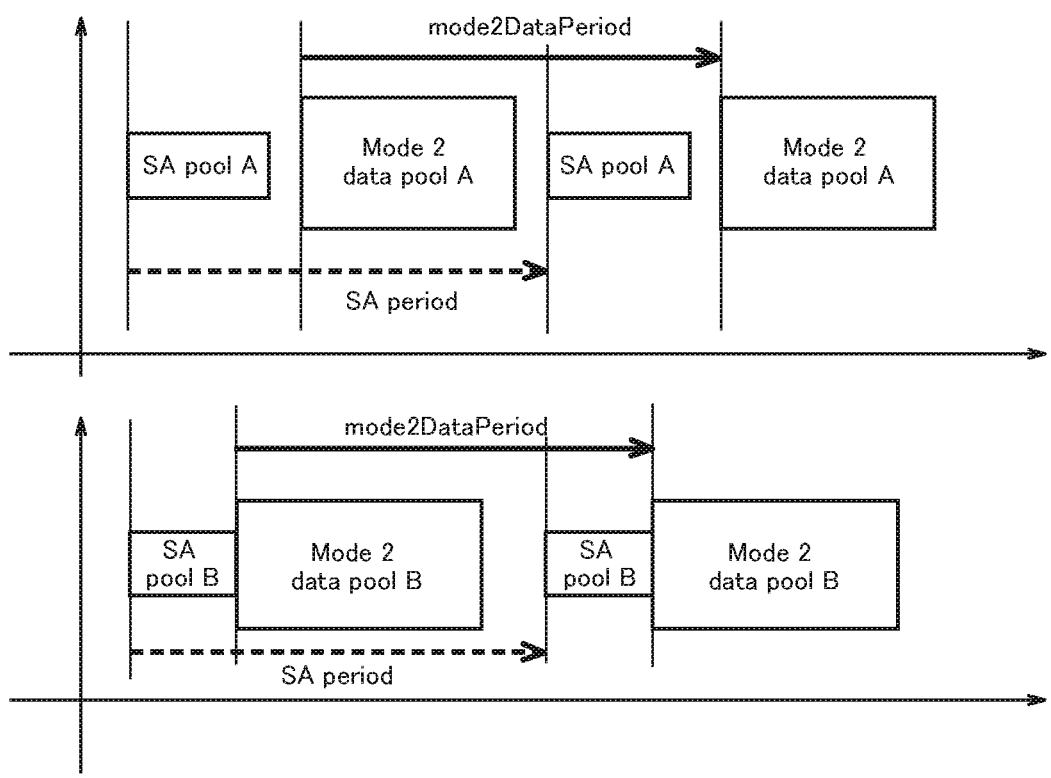
FIG. 9 is a diagram for describing a Communication resource pool according to the second embodiment.

The Communication resource pool will be described. Description will be provided by using FIG. 9. FIG. 9 is a diagram for describing the Communication resource pool according to the second embodiment.

The Communication resource pool includes an SA resource pool that is a pool of radio resources available for exchanging SA, and a data resource pool that is a pool of radio resources available for exchanging D2D communication data.

In the present embodiment, when it is assumed that a set including one SA resource pool and a data resource pool of which the location is indicated by the SA resource pool as one Communication resource pool, a plurality of Communication resource pools different in arrangement in a time-frequency direction are provided. Therefore, a plurality of SA resource pools different in arrangement in a time-frequency direction and a plurality of data resource pools different in arrangement in a time-frequency direction are arranged.

A case where a plurality of Communication resource pools are provided will be described by using FIG. 9, below. Here, it is assumed that the data resource pool is used in the second mode. A first SA resource pool (hereinafter, "SA pool A") indicates a location of a data resource pool (hereinafter, "data pool A"), and a second SA resource pool (hereinafter, "SA pool B") indicates a location of a second data resource pool (hereinafter, "data pool B").

As shown in FIG. 9, in the time direction, a head of the SA pool A and a head of the SA pool B match. Therefore, an offset value from a reference value is the same in each of the SA pool A and the SA pool B. Further, periods (SA period) in the respective time directions of the SA pool A and the SA pool B are the same. On the other hand, in the time direction, a head of the data pool A and a head of the data pool B are deviated. Therefore, an offset value from a reference value differs depending on each of the data pool A and the data pool B. Periods (mode 2 Data periods) in the respective time directions of the data pool A and the data pool B are the same. Here, in the time direction, the SA pool A and the data pool B overlap. In this case, the SA pool A preferably is prioritized.

It is noted that when the mode of the D2D communication is the first mode, the eNB 200 selects an SA resource pool used by a predetermined UE 100 from among a plurality of SA resource pools, and transmits setting information including information on the selected SA resource pool to a predetermined UE 100 via a PDCCH, for example. The UE 100 sets an SA resource pool used for the D2D communication and a data resource pool indicated by the SA resource pool, on the basis of the setting information. On the other hand, when the mode of the D2D communication is the second mode, the UE 100 selects an SA resource pool from among a plurality of SA resource pools, and selects a data resource pool from among a plurality of data resource pools. The UE 100 uses the selected SA resource pool and the selected data resource pool to perform the D2D communication.

(D2D Synchronization Signal)

TABLE 2

| Item | Num of bits |
|---|---|
| Transmission pool for D2D communication Mode 2 | 6 bits |
| Resource pool index for Mode-2 data transmission (3 bits) | |
| Resource pool index for Mode-2 Scheduling Assignments transmission (3 bits) | |
| Whether this D2DSS is originally derived from eNB | 1 bit |
| D2D SFN(10 bits) and slot number(5 bits) | 15 bits |
| Max Tx power | 1 bit (Max power/predefined reduced power) [In-coverage UE only] |
| Hop count | 0 bits |
| Total | 23 bits |

As shown in Table 2, the PD2DSCH is capable of carrying D2D resource information. Specifically, the PD2DSS includes information indicating a transmission resource pool used in the second mode. The information includes an index indicating an SA resources used for transmitting the SA and an index indicating a data resource used for transmitting the data. It is possible to indicate each index information by 3 bits, for example.

(Operation According to the Second Embodiment)

Next, an operation according to the second embodiment will be described by using FIG. 8.

In the present embodiment, the eNB 200 sets a plurality of Communication resource pools (hereinafter, "plurality of in-cell resource pools") available in the cell coverage of the cell 250. The eNB 200 (cell 250) transmits, to at least the UE near the cell end and in the cell coverage of the cell 250, setting information including the information on the plurality of in-cell resource pools. Each of the plurality of in-cell resource pools is mapped with each of the plurality of indexes. The UE that receives the setting information stores each of the plurality of in-cell resource pools and the corresponding index. Further, the UE stores a cell identifier indicating the cell 250 from which the plurality of in-cell resource pools are transmitted in a manner to be mapped with the plurality of in-cell resource pools.

Further, the UE receives, from the eNB 200, information (index (and D2D frequency ID)) designating the transmission resource pool from the plurality of in-cell resource pools. The UE is capable of performing the D2D communication by using the time-frequency resource of the designated in-cell resource pool. It is noted that the in-cell resource pool includes an SA resource pool and a data resource pool. Therefore, each of the plurality of SA resource pools is mapped with each of the plurality of indexes. The same is true of the data resource pool.

Further, the eNB 200 sets a plurality of Communication resource pools (hereinafter, "plurality of out-of-cell resource pools") available out of the cell coverage of the cell 250. The eNB 200 transmits, to the UE in the cell coverage of the cell 250, setting information including the information on the plurality of out-of-cell resource pools. Each of the plurality of out-of-cell resource pools is mapped with each of the plurality of indexes. The UE that receives the setting information stores each of the plurality of out-of-cell resource pools and the corresponding index. It is noted that the plurality of out-of-cell resource pools are a previously set resource pool used in the D2D communication in the second mode.

When performing the D2D communication in a second mode, when moving out of the cell coverage, for example, the UE that receives the setting information selects at least any one of the out-of-cell resource pools from among the plurality of out-of-cell resource pools. The UE is capable of performing the D2D communication by using the selected out-of-cell resource pool as the transmission resource pool. Alternatively, the data resource pool designated by the index from another UE is used, as the reception resource pool, to perform the D2D communication. It is noted that in much the same way as in the in-cell resource pool, the out-of-cell resource pool includes an SA resource pool and a data resource pool.

Here, the plurality of out-of-cell resource pools include a specific Communication resource pool (hereinafter, "specific resource pool"). One out-of-cell resource pool may be a specific resource pool, and two or more out-of-cell resource pools may be a specific resource pool.

In such an operation environment, the following operation is performed.

Firstly, the eNB 200 sets the UE 100-1 located near the cell end of the cell 250 and in the cell coverage, as the D2D synchronization source. The eNB 200 transmits, to the UE 100-1, setting information for setting the UE 100-1 as a D2D synchronization source. Further, the eNB 200 transmits the information (index) for designating the transmission resource pool from among the plurality of in-cell resource pools. The information may be included in the setting information. Description proceeds with an assumption that the index indicates "N". The index designates an in-cell resource pool corresponding to N (hereinafter, "in-cell resource pool N") from among the plurality of in-cell resource pools.

It is noted that the index indicates the in-cell resource pool used for transmitting the SA in the second mode and indicates the in-cell resource pool used for transmitting the data in the second mode; however, hereinafter, the both indexes are collectively described as "index". It is noted that the in-cell resource pool used for transmitting the SA in the second mode is different from the in-cell resource pool used for transmitting the data in the second mode.

Further, the UE 100-1 sets, as the reception resource pool, an in-cell resource pool corresponding to the transmission resource pool designated from the eNB 200, from among the plurality of in-cell resource pools. That is, the UE 100-1 sets, as the reception resource pool, the in-cell resource pool N designated by the index.

Further, in addition to the in-cell resource pool N, the UE 100-1 sets the specific resource pool as the reception resource pool. Here, the specific resource pool may be provided separately of the plurality of in-cell resource pools and be notified of the specific resource pool from the eNB 200. Alternatively, the eNB 200 may set the plurality of in-cell resource pools so that each of the plurality of in-cell resource pools includes the specific resource pool. In this case, when the UE 100-1 sets the in-cell resource pool N as the reception resource pool, the specific resource pool is automatically set as the reception resource pool.

Secondly, the UE 100-1 that receives the setting information performs the setting for becoming a D2D synchronization source, and starts transmitting the D2D synchronization source. Here, the D2D synchronization signal includes an index for designating the in-cell resource pool. The index is included in the PD2DSCH and indicates the in-cell resource pool N designated by the eNB 200.

The D2D synchronization signal includes identification information for identifying the cell in which the UE that transmits the D2D synchronization signal exists. The D2D synchronization signal may include information for controlling transmission power of an out-of-cell-coverage UE.

Thirdly, the UE 100-2 that receives the D2D synchronization signal determines whether or not the in-cell resource pool N corresponding to the index included in the D2D synchronization signal is stored. When the in-cell resource pool N is stored, the UE 100-2 starts controlling to start the D2D communication by using the in-cell resource pool N. Specifically, the UE 100-2 selects the in-cell resource pool N from among the plurality of in-cell resource pools, and sets the in-cell resource pool N as the transmission resource pool and the reception resource pool.

On the other hand, when the in-cell resource pool N corresponding to the index is not stored, the UE 100-2 sets the specific resource pool as the transmission resource pool and the reception resource pool. When the specific resource pool is equal to the out-of-cell resource pool (that is, the specific resource pool is not a part of the out-of-cell resource pool), the UE 100-2 sets the out-of-cell resource pool as the transmission resource pool and the reception resource pool. The UE 100-1 sets the specific resource pool as the reception resource pool, and thus, even when the UE 100-2 does not know the resource pool indicated by the index, it is possible to perform the D2D communication. Further, in the radio resource in the specific resource pool, the assignment for the cellular communication is restricted, and thus, the D2D communication is capable of restraining the interference from being applied to the user terminal that performs the cellular communication. Further, the index is used to identify the transmission resource pool, and thus, it is possible to reduce an amount of information of the signaling.

Alternatively, the UE 100-2 may determine whether or not the in-cell resource pool mapped with the cell 250 indicated by the information for identifying the cell is stored. That is, the UE 100-2 may determine whether or not the in-cell resource pool N is mapped with the cell 250. When the in-cell resource pool N is mapped with the cell 250, the UE 100-2 starts controlling to start the D2D communication by using the in-cell resource pool N.

On the other hand, when the in-cell resource pool N is not mapped with the cell 250, that is, when the in-cell resource pool N is mapped with another cell, even when the in-cell resource pool corresponding to the index is stored, the UE 100-2 sets the specific resource pool as the transmission resource pool and the reception resource pool. As a result, even when values of the index mapped with the in-cell resource pool differ between the cells, the D2D communication is capable of appropriately restraining the interference from being applied to the user terminal that performs the cellular communication.

It is noted that when the UE 100-2 existed in the cell 250 in the past (when the UE 100-2 was located in the cell coverage of the cell 250), the UE 100-2 receives the plurality of in-cell resource pools from the eNB 200 (cell 250), and stores the plurality of received in-cell resource pools to be mapped with the transmission-source cell 250. Alternatively, the UE 100-2 may receive, from the eNB 200 (cell 250), a mapping list in which a plurality of in-cell resource pools are mapped with a plurality of cells, and then, may store the mapping list.

Thereafter, the UE 100-2 uses the set transmission resource pool to transmit the SA and the data. On the other hand, the UE 100-1 uses the reception resource pool to receive the SA and the data.

As described above, when the in-cell resource pool corresponding to the index is stored, the UE 100-2 transmits the data by using the corresponding in-cell resource pool. When the in-cell resource pool corresponding to the index is not stored, the UE 100-2 transmits the data by using the specific resource pool. This makes it possible to reduce information for notifying the in-cell resource pool. As a result, it is possible to reduce an amount of information from the UE 100-1 to the UE 100-2. Further, the UE 100-2 is capable of restraining the interference applied to the cellular UE.

OTHER EMBODIMENTS

In the above-described first embodiment, examples of the identification information include the cell identifier and the D2D synchronization signal generated on the basis of the cell identifier; however, this is not limiting. The identification information may suffice if it indicates that the UE 100-1 is located in the cell, and may be flag information indicating whether or not located in the cell, for example. When the setting information of the in-cell resource pool is common between the cells, as long as receiving the flag information, the UE 100-2 is capable of restraining the interference applied to the cellular UE even if not receiving the cell identifier.

In the above-described second embodiment, the eNB 200 sets the plurality of in-cell resource pools and the plurality of out-of-cell resource pools; however, it is not limiting. One in-cell resource pool and one out-of-cell resource pool may be set. Further, an upper device of the eNB 200 (for example, MME), rather than the eNB 200, may set these resource pools.

Further, in the above-described second embodiment, the index includes the index that indicates the in-cell resource pool used for transmitting the SA in the second mode (hereinafter, "SA index") and the index that indicates the in-cell resource pool used for transmitting the data in the second mode (hereinafter, "data index"); however, this is not limiting. For example, when the SA includes the information indicating the resource pool used for transmitting the data in the second mode, the above-described index may be the SA index only.

Further, in each of the above-described embodiments, description proceeds with a particular focus on a case where the in-cell resource pool includes the specific resource pool (and the out-of-cell resource pool); however, this is not limiting. The in-cell resource pool may not include the specific resource pool (and the out-of-cell resource pool).

For example, the UE 100-2 transmits the flag information indicating the use of the specific resource pool. The flag information is included in the SA, for example. The UE 100-1 that receives the flag information sets the specific resource pool as the reception resource pool. The UE 100-2 sets the specific resource pool as the transmission resource pool, and transmits the data. On the other hand, the UE 100-1 sets the specific resource pool as the reception resource pool, and thus, the UE 100-1 is capable of receiving the data. The in-cell resource pool does not include the specific resource pool, and thus, the UE 100-1 is capable of grasping that the number of UEs that transmit the data by the specific resource pool is the number of out-of-cell-coverage UEs. The UE 100-1 may transmit the grasped number of out-of-cell-coverage UEs, to the eNB 200. When the number of out-of-cell-coverage UEs is less than a threshold value (for example, 1), the eNB 200 may instruct the UE 100-1 to stop transmitting the D2D synchronization signal.

It is noted that when the in-cell resource pool includes the specific resource pool (and the out-of-cell resource pool), if the UE 100-1 sets the in-cell resource pool, then the UE 100-1 is capable of receiving the data from the UE 100-2 even when the specific resource pool is not additionally set. Further, the UE 100-1 is capable of transmitting the data by the specific resource pool, and thus, the out-of-cell-coverage UE (UE 100-2) is capable of receiving the data from the UE 100-1.

Thus, in each of the above-described embodiments, the in-cell resource pool may not include the specific resource pool, and may not include the out-of-cell resource pool itself. Further, the in-cell resource pool may include a part of the out-of-cell resource pool including the specific resource pool, and may not include a part of the out-of-cell resource pool.

Further, in the above-described second embodiment, the UE 100-1 that transmits the D2D synchronization signal (index) sets, in addition to the first resource pool, the specific resource pool, as the reception resource pool; however, this is not limiting. Another in-cell-coverage UE not transmitting the D2D synchronization signal may set the specific resource pool as the reception resource pool. The same is true of the first embodiment.

In the embodiment described above, although an LTE system is described as an example of a mobile communication system, it is not limited to the LTE system, and the present invention may be applied to a system other than the LTE system.

APPENDIX

Supplementary items of the embodiment will be described below. In this appendix, the design of D2DSS and PD2DSCH will be described.

(Bit Design)

Table 3 shows details of the bit allocation of the PD2DSCH.

TABLE 3

| Item | Num of bits |
|---|---|
| Bandwidth | 3 bits |
| Whether this D2DSS is originally derived from eNB | 1 bit |
| D2D SFN(10 bits) and slot number(5 bits) | 15 bits[FFS] [If the synchronization resource is restricted to several subframes, the bit size can be reduced.] |
| Max Tx power | 1 bit (Max power/predefined reduced power[FFS]) [In-coverage UE only] |
| Hop count | 0 bits [Not support] |
| Total | 20 bits |

(Transmission Pool for D2D Communication Mode 2)

PD2DSCH do not have sufficient number of bits to deliver the in-coverage SA and data resource pool configuration information. Therefore, not sending that information via PD2DSCH is proposed.

(Preconfigured in-Coverage Resource Pool for Out of Coverage UEs)

It is assumed for the partial coverage case the in-coverage synchronization sources need to convey transmission pool information to the out of coverage UEs. In order to minimize number of bits used by PD2DSCH is not to send the SA/Data resource pool information to the out-of-coverage UEs. Then the only way the out-of-coverage UEs can obtain the above information is when they were in-coverage. In addition, there could be several out-of-coverage UEs which have never been in-coverage thus did not receive the resource pool information. Therefore, it is proposed that out of coverage UEs should be preconfigured for the in-coverage resource pool. If out of coverage UEs received PD2DSCH and they don't have configured in-coverage pools, they use preconfigured in-coverage pool.

Proposal 1: PD2DSCH should not include the transmission pool information of SA and Mode 2 Data.

Proposal 2: Out of coverage UEs should have preconfigured pools for in-coverage resource pool.

(D2D SFN and Slot Number)

This parameter indicates the position of D2DSS and PD2DSCH. If the synchronization resource is restricted to several subframes, the bit size can be reduced.

(Max Tx Power)

In order to protect the cellular system, it is proposed to include a power control bit in the PD2DSCH that can be received at the out-of-coverage UEs. This bit in only valid if the in-coverage UE is using D2DSS derived from the eNB.

Proposal 3: In order to protect the cellular system, it is proposed to include a power control bit in the PD2DSCH that can be received at the out-of-coverage UEs.

(Physical Design)

In this section the detail physical design of PD2DSCH in Table 3 is described.

(PD2DSCH Design)

PD2DSCH should reuse PBCH design. It is proposed that PD2DSCH have 4 symbols and is placed just after D2DSS.

Proposal 4: PD2DSCH should reuse PBCH design. It is proposed that PD2DSCH have 4 symbols and is placed just after D2DSS.

(Resource Selection)

D2DSS configuration should have at least 2 candidate locations within synchronization period to avoid the collision. Out of coverage UEs select one of them randomly. In-coverage UEs are configured by eNBs which resource is used.

Proposal 5: D2DSS configuration should have at least 2 candidate locations within the synchronization period.

(D2DSS for Communication)

It is proposed that the D2DSS resources should be allocated in the first subframe of the SA pools because synchronization should be executed before SA reception.

Proposal 6: The D2DSS resources should be allocated in the first subframe of the SA pools.

CROSS REFERENCE

It is noted that the entire content of U.S. Provisional Application Patent Application No. 62/035,225 (filed on Aug. 8, 2014) is incorporated in the present specification by reference.

INDUSTRIAL APPLICABILITY

As described above, the present invention is useful in the field of mobile communication.

The invention claimed is:

1. A communication control method that supports direct communication that is direct Device-to-Device communication, comprising:
    transmitting, by a first user terminal in a cell coverage, to another user terminal, identification information for identifying that the first user terminal is located in a cell;
    receiving from a base station, by the first user terminal, information indicating a first type of transmission radio resource pool usable for the direct communication and a second type of transmission radio resource pool usable for the direct communication;
    transmitting, by a second user terminal, first information on the first type of transmission radio resource pool;
    receiving, by the first user terminal, the first information; and
    determining based on the first information, by the first user terminal, whether to perform the direct communication by using the first type of transmission radio resource pool or to perform the direct communication by using the second type of transmission radio resource pool.

2. A first user terminal that supports direct communication that is direct Device-to-Device communication, comprising:
    a transmitter,
    a receiver, and
    a controller, wherein
    the transmitter is configured to transmit, when the first user terminal is in a cell coverage, to another user terminal, identification information for identifying that the first user terminal is located in a cell,
    the receiver is configured to receive from a base station, information indicating a first type of transmission radio resource pool usable for the direct communication and a second type of transmission radio resource pool usable for the direct communication,
    the receiver is further configured to receive from a second user terminal, first information on the first type of transmission radio resource pool; and the controller is configured to determine, based on the first information, whether to perform the direct communication by using the first type of transmission radio resource pool or to perform the direct communication by using the second type of transmission radio resource pool.

* * * * *